May 29, 1951 L. D. JONES 2,554,622
FLUID CONDUIT CONNECTIONS TO CENTRIFUGAL MACHINES
Filed Jan. 25, 1947 2 Sheets-Sheet 1
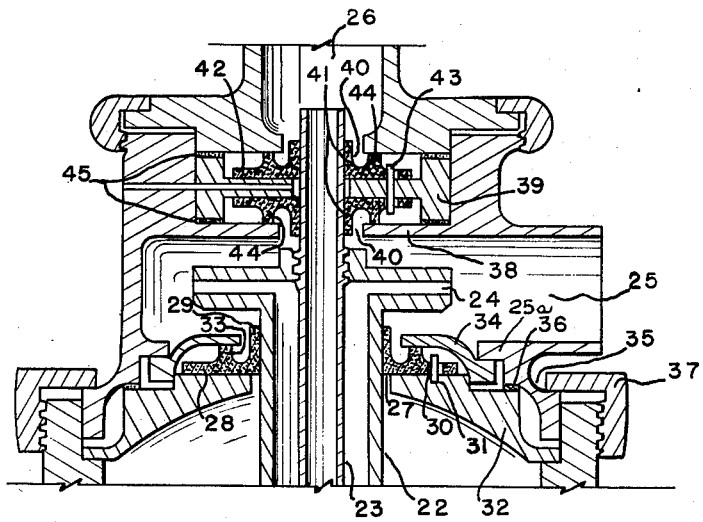
Fig. 2
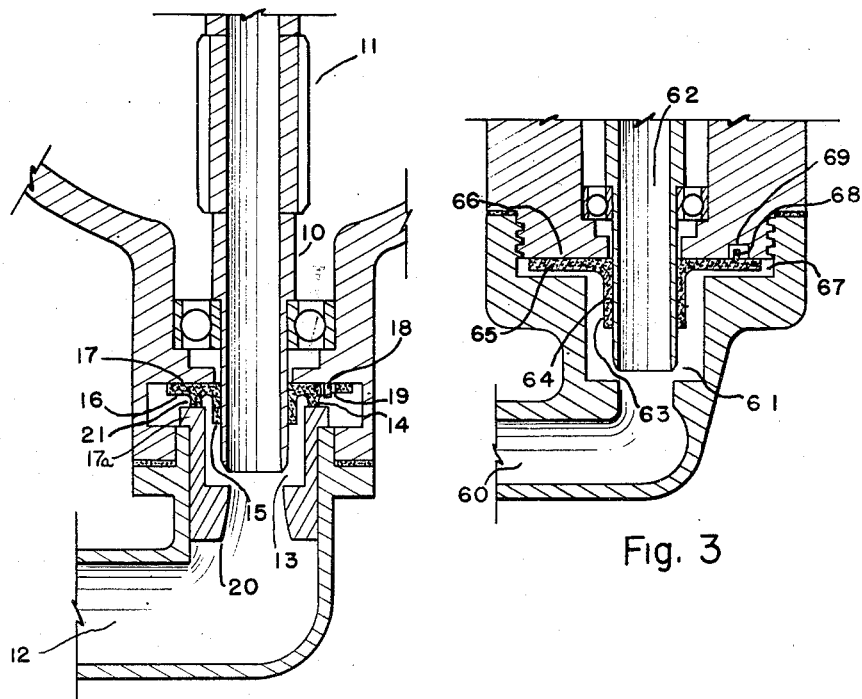
Fig. 1
Fig. 3
INVENTOR.
LEO D. JONES
BY Maurice A. Crews
ATTORNEY May 29, 1951 L. D. JONES 2,554,622
FLUID CONDUIT CONNECTIONS TO CENTRIFUGAL MACHINES
Filed Jan. 25, 1947 2 Sheets-Sheet 2
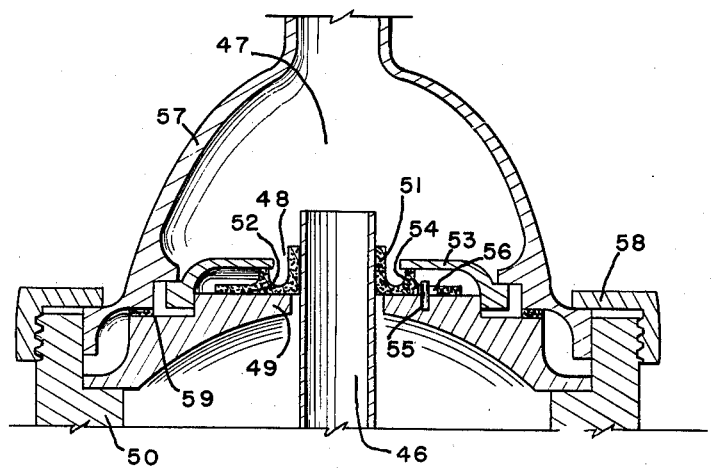
Fig. 4
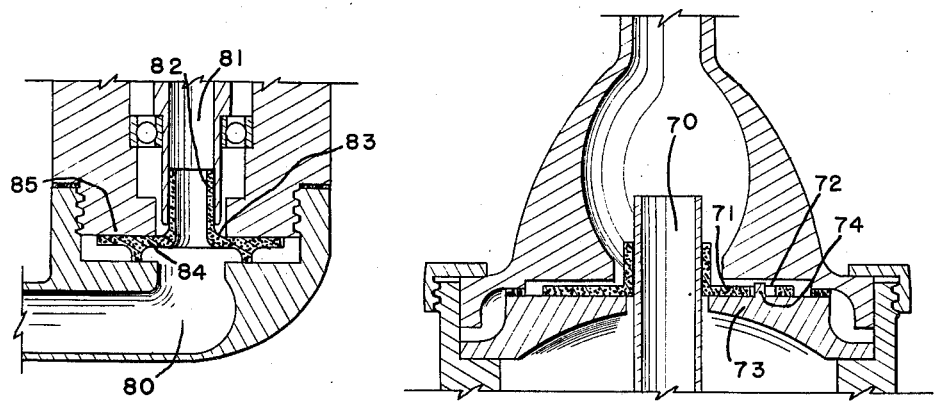
Fig. 6
Fig. 5
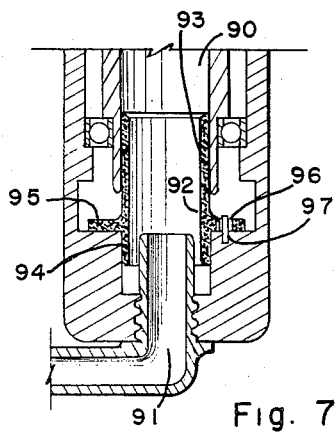
Fig. 7
INVENTOR.
Leo D. Jones
BY
Maurice A. Crews
ATTORNEY Patented May 29, 1951

2,554,622

UNITED STATES PATENT OFFICE 2,554,622

FLUID CONDUIT CONNECTIONS TO CENTRIFUGAL MACHINES

Leo D. Jones, Philadelphia, Pa., assignor to The Sharples Corporation, a corporation of Delaware Application January 25, 1947, Serial No. 724,311

6 Claims. (Cl. 285—97.9)

The present invention pertains to the art of transferring liquid between rotating and non-rotating conduits in the operation of a centrifugal machine. It is especially concerned with this problem as it is encountered in design and use of centrifugal separators of the so-called full bowl type, and will accordingly be described in reference to a machine of this type.

In the passage of liquid from the non-rotating feed conduit of a centrifugal machine of the full bowl type into the rotating feed conduit secured to the centrifugal rotor, it is of course necessary to provide suitable seals for prevention of leakage. The same problem is encountered in transfer of liquid from the rotating discharge conduits into non-rotating discharge conduits designed to receive the liquid effluents. It has been suggested in the past to meet this problem of leakage by use of flexible seals of the familiar hat type. The seals have ordinarily been constructed of a rubber composition, and the movements of the rotating shaft away from the center of rotation encountered in operation of the machine have been accommodated by the flexing of these seals. At least two disadvantages are inherent in this arrangement. In the first place, the continual flexing of the portions of the seals tends to cause excessive wear and reduce the life of the seals, and in the second place, this flexing impairs the efficiency of the seals in accomplishing their sealing function. In the use of hat type seals in full bowl centrifugal machines of the prior art, the seal has been provided with a flange which is rigidly secured or confined, being ordinarily secured to a stationary part of the housing of the centrifugal machine.

A feature of the present invention consists in the fact that it provides a sealing arrangement in which no part of the flexible sealing member is rigidly secured or confined, but in which the sealing relationship of the parts of the seal is accomplished, both with respect to the rotating hollow shaft and to the associated stationary member, primarily under the influence of the pressure of the fluid being passed through the machine. By this arrangement, a relatively uniform sealing contact is accomplished between the flexible seal and the associated surface with which it coacts to accomplish its sealing function, and unusual wear at localized points on the seal is thereby prevented. A further feature of the invention consists in the fact that the seal is mounted in such a way as to permit lateral movement of the entire sealing surface together with the shaft, while restraining the seal against rotational movement.

Further features and advantages of the invention, and the manner in which they are attained, will be evident from reading of the following specification in the light of the attached drawing, in which:

Figures 1 and 2 illustrate the application of the features of the invention to feed and discharge of fluids to and from a centrifugal rotor, Figure 3 is a modification of the sealing device associated with the centrifugal feed, Figure 4 shows the application of the seal to a single liquid effluent discharge.

Figure 5 illustrates use of a sealing device of the invention in feeding liquid into the upper end of a centrifugal rotor, and Figures 6 and 7 illustrate further modifications.

Referring to the drawing by reference characters, a rotating conduit in the form of a hollow shaft or spindle 10 may be secured at its upper end to a centrifugal rotor and driven by a gear 11, which receives power from any suitable source. The shaft 10 receives the fluid to be treated, such as a mixture of liquids to be subjected to centrifugation, from a non-rotating feed conduit 12, including an enlarged chamber 13 communicating with the shaft 10.

The sealing connection between the enlarged chamber 13 constituting the upper end of the feed conduit and the shaft 10 is in the form of a flexible and elastic sealing member or washer 14 having a central tubular part 15 telescoping with the shaft. As illustrated in the drawing, the tubular part 15 of the flexible seal 14 surrounds the shaft 10 and is urged into sealing relationship to the shaft by the pressure of the fluid under treatment. An extension or flange 16 having an axially disposed face, is formed at the upper end of the tubular portion 15 and is adapted to exert sealing pressure against the surface 17 which constitutes the uppermost portion of the feed conduit 12 and the upper wall of the chamber 13. A projection or pin 18 extends downwardly from the surface 17 and is adapted to enter a slot or enlarged hole 19 formed in the extension or flange 16 of the flexible seal 14. Since this slot or hole is substantially larger in radial dimension than the projection or pin 18, there is thus formed a pin and slot connection which restrains the flexible seal against rotation with the shaft 10, but at the same time permits it to move laterally in accordance with the lateral movements of the shaft 10. By this arrangement, flexing of the seal incident to use of the apparatus is minimized.

A suitable feed piece 20 may be included in the conduit 12 at a point just below the lower extremity of the hollow shaft or conduit 10. In the preferred form of the invention, there is provided a raised boss or projection 21 on the lower surface of the flange 16, as an assistance in locating this flange in close proximity to the surface 17 against which it performs its sealing function when fluid pressure is applied by passage of fluid through the apparatus. Projection 21 has an axially disposed face which contacts the annular housing surface 17a for the above purpose. The upper surface of the flange 16 will thus be caused to rest gently against the surface 17 even when no fluid pressure is applied. It should be noted in this connection, however, that it is not essential, in the practice of the invention, that this relationship exist, for these parts may be designed with a clearance between the upper surface of the flange 16 and the surface 17, with reliance upon the fluid pressure to establish contact between these parts.

The connection between the hollow shaft or conduit 10 and the rotor is not shown, as neither this feature, the arrangement of bearings nor the internal construction of the rotor constitutes any part of the present invention. For the purpose of consideration of the present invention, which pertains only to the feed of liquid to the rotor or discharge from the rotor, it is sufficient to note that the upper end of the conduit 10 has a fluid connection to a lower part of the rotor, that separation, clarification or concentration of liquids takes place in the rotor, and that the liquid effluent or effluents are discharged from the main body of the rotor through a discharge conduit or conduits rotating with the upper end of the rotor, which conduits may be sealed against leakage by sealing arrangements operating on the same principles discussed above in connection with the feed conduit. In the form of the invention disclosed in Figure 2, there is illustrated an embodiment of the invention especially useful in connection with a machine employing a rotor of the so-called separator type, designed to separate and separately discharge two liquid effluents. The heavier effluent (e g., skim milk) is discharged through the conduit formed between the inner wall of a tube 22 and the outer wall of a tube 23, and this discharge may be through centrifugal impeller 24 secured at the upper end of the tube 22, as illustrated. The liquid is discharged into a non-rotating chamber 25 which constitutes the receiving end of the stationary conduit by which the heavier effluent is delivered from the machine.

The lighter effluent discharge conduit 23 extends beyond the upper extremity of the conduit 22 and liquid is delivered from the conduit 23 into a non-rotating chamber 26 through which it passes to an associated conduit for delivery from the machine. In an arrangement of this kind, it is of course necessary that the stationary chambers or conduits which receive the respective effluents from the rotating discharge conduits be sealed against loss of liquid or passage of liquid from one effluent-receiving conduit to the other.

As illustrated, the sealing devices at the delivery end of the machine include a flexible seal 27 similar to the seal 14, provided for prevention of leakage downwardly along the outside of the tube 22 from the chamber 25. This flexible seal includes a flange 28, central tubular portion 29 and enlarged hole 30, this hole being somewhat larger than the projection or pin 31 extending upwardly from the housing cover 32, in order to allow lateral play of the seal. A raised boss or projection 33 is provided on the upper surface of the flange 28, and the under surface of a seal cover 34 is adapted to abut the upper surface of this projection. The seal cover and seal are held in position by an overhanging annular lip 25a formed upon the inner wall of the chamber 25, and the under surface of the seal cover 34 is designed to rest upon the upper surface of the projection 33 under the force of gravity, or under relatively slight pressure, so that the seal 27 will still be permitted lateral movement relative to the pin 31 and other stationary surfaces, even when fluid is passed under pressure through the machine. By this arrangement, the seal is permitted to accommodate itself to lateral movements of the tube 22 without flexure. A gasket 36 is provided between the housing cover 32 and a lower abutting surface of the wall of the chamber 25, and this abutting surface is adapted to be brought into sealing engagement with the gasket by the application of force to extension 35 of the wall of the chamber 25 by the securing nut 37.

The upper end of the chamber 25 is provided with an annular surface 38 which supports a seal locating or supporting member 39 and associated seals for preventing leakage of liquid between the heavy effluent discharge-receiving chamber 25 and the light effluent discharge-receiving chamber 26. The seal locating member 39 may be in the form of a metal plate, and the seals 40 are located upon opposite sides of that plate. As in the cases of the seals previously described, each of the seals associated with the supporting member 39 comprises a tubular portion 41 and a flanged portion 42. Pins or projections 43 extend from the upper and lower surfaces of the seal supporting member 39, and the flanges 42 are provided with holes which permit lateral play of the seals 40 relatively to the projections 43 and other stationary parts, just as in the cases of the seals previously described. The flanges 42 of the seals are also preferably provided with bosses or projections 44, as in the case of the seals previously described. The outer circumference of the seal supporting member 39 is thicker than the central portion thereof and gaskets 45 are provided in order to insure sealing of this circumferentially enlarged portion against associated surfaces.

From the above discussion, it will be seen that the objects of the invention have been attained by provision of seals which, in every case, derive their sealing effect primarily from the pressure of the liquid under treatment, and that these seals are permitted lateral movement without flexure, due to the fact that their flanged portions are free to move laterally.

Figs. 1 and 2 illustrate a sealing connection especially useful in combination with a rotor of the so-called separator type. However, it will be understood that the seal assembly of the invention may be used on either the feed connection or the discharge connection of many types of centrifugal machines. In use of a rotor of the clarifier type, the feeding arrangement of Figure 1 may be employed without change, but the discharge connections are modified as illustrated in Figure 4. In this embodiment of the invention, a rotating discharge conduit 46 from a centrifugal rotor is provided to direct liquid into the stationary chamber 47. A sealing device 48 is provided between the lower wall 49 of the chamber, which may rest on or be a part of the rotor housing 50, and the periphery of the rotating conduit 46. This sealing device comprises a tubular portion 51 which is held in sealing relationship with the periphery of the conduit by fluid pressure, and a flange portion 52 which is held in sealing relationship to the upper surface of the lower wall 49 of the chamber by fluid pressure. A seal cover 53 rests on the upper surface of a projection 54 from the flange of the seal preventing disengagement but permitting free lateral movement of the seal. The pin 55 from the lower wall 49 of the chamber is located in the enlarged hole 56 of the seal flange to prevent rotation of the seal with the conduit. The upper wall 57 of the chamber 47 is held in place by the nut 58 and a sealing connection between the upper and lower walls of the chamber is provided by means of a gasket 59.

In the modification of Figure 3, which may be employed either in connection with feed or discharge of liquid from a centrifugal rotor, the stationary conduit 60 is provided with a chamber 61 at its upper end, and this chamber is in communication with a rotating hollow shaft 62. A flexible sealing member 63 is provided with a sleeve 64 which surrounds the shaft 62 and is held in sealing relationship with it by fluid pressure in the chamber 61. The flange 65 of the seal abuts against the upper wall 66 of the chamber 61 and is held in sealing relationship with this wall by fluid pressure. Clearance is provided at 67 to permit the seal to move in a lateral direction, while the upper surface of the flange 65 is provided with an extension 68 which enters a recess 69 in the wall 66. Since the recess 69 is larger in radial dimension than the extension 68, lateral movement of the seal will be permitted, but rotation of the seal with the shaft will be prevented by this arrangement.

Figure 5 illustrates a modification in which the seal is used on a hollow rotating shaft 70 at the top of the separator. The flange 71 is slotted at 72 while the surface 73 of the housing has a raised projection or pin 74. The radial dimension of the slot is sufficiently greater than the diameter of the pin to permit the entire seal to move laterally with the shaft 70, but contact between the pin and the slot prevents rotation of the seal.

In Figure 6 the chamber 80 is in fluid communication with the hollow rotating shaft 81. The sleeve 82 of the flexible seal 83 is held in contact with the inside of the bore of the hollow rotating shaft under fluid pressure. The seal has a flange 84 which seals against the surface 85 of the chamber when there is fluid pressure within the chamber.

In Figure 7 the hollow rotating conduit 90 is in fluid communication with a stationary conduit 91. The seal 92 has a sleeve 93 which is held in contact with the inside of the hollow rotating shaft by fluid pressure and an extension 94 which is held in contact with the walls of the stationary structure by fluid pressure. The raised extension 95 which preferably is circumferential to the outside of the seal serves to prevent downward movement of the seal; an enlarged hole 96 in this extension surrounds a pin 97 projecting from the wall of the chamber thus preventing rotation of the seal.

Other modifications and applications of this sealing device will be apparent to those skilled in the art, and I wish to be limited only by the scope of the following claims.

I claim:

1. A seal assembly for a device having a stationary housing and a member rotating at high speed in said housing, which comprises a resilient annular washer having a relatively large axially disposed face adapted to seal against a radial surface on the stationary housing, an elongated sleeve attached to said resilient washer and adapted to fit over the rotating member in sealing relation thereto, means on said stationary housing surface for engaging the washer to permit limited radial movement between the washer and the surface and to prevent substantial rotational movement between the surface and the washer, and resilient means for pressing said axially disposed face of the washer against the stationary housing.

2. A seal assembly for centrifuges having a stationary housing and a member rotating at high speed in said housing, which comprises a resilient annular washer having a relatively large axially disposed face adapted to seal against an annular surface on the stationary housing, an elongated sleeve attached to said washer and adapted to fit over the rotating member in sealing relation thereto, means on said stationary housing adapted to engage the washer to permit limited radial movement between the washer and the housing and to prevent substantial rotational movement between the housing and the washer, and a second annular surface on the housing adapted to lightly retain the washer in an axially fixed position with respect to the rotating member and the first-named surface.

3. A seal assembly for centrifuges having a stationary housing and a member rotating at high speed in said housing, which comprises a resilient annular washer having a relatively large axially disposed face adapted to seat against an annular surface on the stationary housing, an axially elongated sleeve formed integrally with said washer adapted to fit over the rotating member in sealing relation thereto, means on said stationary housing surface adapted to engage the washer to permit limited radial movement between the washer and the housing and to prevent substantial rotational movement between the housing and the washer, a second annular surface on the housing, an annular axially facing boss on the side of the washer opposite said first-named surface and adapted to lightly contact the second surface when the washer is in an unstressed condition, and an annular recess formed between the surfaces, said recess being accessible to fluid on both sides of the boss when the washer is axially pressed to unseat the boss from the second named surface.

4. A seal assembly for centrifuges having a stationary housing and a conduit rotating at relatively high speed with respect to the housing, which comprises an annular surface on the housing surrounding the rotating conduit, an axially disposed face on said surface, a resilient washer adapted to have relatively stationary sealing contact with said axially disposed face, a resilient tubular sleeve formed integrally with said washer and adapted to surround the conduit in rotational sealing relation thereto, an annular shoulder on said housing in axial spaced relation with said surface, walls defining an annular recess formed in the housing between the shoulder and the face, said recess being of greater diameter than the washer, means on the housing and the washer for preventing rotation between the housing and the washer but permitting limited radial movement therebetween, and an annular positioning face on the washer, opposite the sealing face on the housing adapted to abut the shoulder to retain the washer and sleeve in axial position with respect to the housing and conduit.

5. A seal assembly for a device having a stationary housing and a member rotating at high speed in said housing, which comprises a resilient annular washer having a relatively large axial disposed face adapted to seal against a radial surface on the stationary housing, an elongated sleeve attached to said resilient washer and adapted to fit in the bore of the rotating member in sealing relation thereto, means on said stationary housing for engaging the washer to permit limited radial movement between the washer and the housing and to prevent substantial rotational movement between the housing and the washer, and resilient means for pressing said axially disposed face of the washer against the surface on the stationary housing.

6. A seal assembly for a device having a stationary housing and a member rotating at high speed in said housing, which comprises a resilient annular washer having a relatively large axially disposed face adapted to seal against a radial surface on the stationary housing, an elongated sleeve attached to said resilient washer and adapted to fit the rotating member in sealing relation thereto, means on said stationary housing for engaging the washer to permit limited radial movement between the washer and the housing and to prevent substantial rotational movement between the housing and the washer, and resilient means for pressing said axially disposed face of the washer against the surface on the stationary housing.

LEO D. JONES.

REFERENCES CITED

The following references are of record in the file of this patent:

UNITED STATES PATENTS

| Number | Name | Date |
|---|---|---|
| 1,806,929 | Bath | May 26, 1931 |
| 2,012,974 | Penniman | Sept. 3, 1935 |
| 2,147,691 | Cramton | Feb. 21, 1939 |
| 2,264,413 | Siegerist | Dec. 2, 1941 |

FOREIGN PATENTS

| Number | Country | Date |
|---|---|---|
| 681,680 | Germany | Sept. 28, 1939 |